US008189866B1

(12) United States Patent
Gu et al.

(10) Patent No.: US 8,189,866 B1
(45) Date of Patent: May 29, 2012

(54) HUMAN-ACTION RECOGNITION IN IMAGES AND VIDEOS

(75) Inventors: Chunhui Gu, Berkeley, CA (US); Eli Shechtman, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 830 days.

(21) Appl. No.: 12/317,340

(22) Filed: Dec. 19, 2008

Related U.S. Application Data

(60) Provisional application No. 61/190,268, filed on Aug. 26, 2008.

(51) Int. Cl.
G06K 9/00 (2006.01)

(52) U.S. Cl. .......................... 382/103; 348/169

(58) Field of Classification Search ................ 382/100, 382/103, 107, 115, 117, 118, 181, 190, 195, 382/203, 206; 348/169–172
See application file for complete search history.

(56) References Cited

U.S. PATENT DOCUMENTS

| | | | | |
|---|---|---|---|---|
| 5,930,379 A * | 7/1999 | Rehg et al. | ................ | 382/107 |
| 5,956,026 A * | 9/1999 | Ratakonda | ................ | 715/723 |
| 7,526,102 B2 * | 4/2009 | Ozer | ................ | 382/103 |
| 2002/0196854 A1 * | 12/2002 | Kim | ................ | 375/240.17 |
| 2005/0089246 A1 * | 4/2005 | Luo | ................ | 382/286 |
| 2007/0288408 A1 * | 12/2007 | Li et al. | ................ | 706/19 |
| 2008/0130948 A1 * | 6/2008 | Ozer | ................ | 382/103 |
| 2008/0199050 A1 * | 8/2008 | Koitabashi | ................ | 382/107 |
| 2010/0086215 A1 * | 4/2010 | Bartlett et al. | ................ | 382/197 |

OTHER PUBLICATIONS

Bourdev, et al. "Robust Object Detection Via Soft Cascade," IEEE Computer Society Conference on Computer Vision and Pattern Recognition (CVPR 2005), Jun. 2005, 8 pages.
Dalal, at al. "Histograms of Oriented Gradients for Human Detection," 2005 IEEE Computer Society Conference on Computer Vision and Pattern Recognition (CVPR '05), vol. 1, No. 1, Jun. 2005, 8 pages.
Fei-Fei, et al. "A Bayesian Hierarchical Model for Learning Natural Scene Categories", IEEE Computer Society Conference on Computer Vision and Pattern Recognition, vol. 2, Jun. 2005, 8 pages.
Ikizler, "Human action recognition using distribution of oriented rectangular patches", Workshop on Human Motion, 2007, 14 pages.
Jones, et al. "Statistical Color Models with Application to Skin Detection," International Journal of Computer Vision, vol. 46, Issue 1, Jan. 2002, 23 pages.
Laptev, et al. "Learning Realistic Human Actions from Movies," IEEE Conference on Computer Vision and Pattern Recognition, Anchorage, Alaska, Jun. 2008, 8 pages.

(Continued)

Primary Examiner — Anand Bhatnagar
(74) Attorney, Agent, or Firm — Fish & Richardson P.C.

(57) ABSTRACT

The present disclosure includes, among other things, systems, methods and program products applying a plurality of low-level feature detectors to an image where each low-level feature detector produces a respective low-level feature vector that represents a detection result. The low-level feature vectors are provided to a plurality of higher-level feature detectors where each higher-level feature detector produces a respective higher-level feature vector that represents a detection result based on a distribution of features in one or more of the low-level feature vectors. The higher-level feature vectors are then provided to a classifier in order to classify a human-action in the image.

28 Claims, 6 Drawing Sheets
(5 of 6 Drawing Sheet(s) Filed in Color)

OTHER PUBLICATIONS

Laptev, "Retrieving actions in movies," IEEE 11$^{th}$ International Conference on Computer Vision (ICCV 2007), Oct. 14-21, 2007, Rio De Janeiro, 8 pages.

Lazebnik, "Bag-of-Features Models" downloaded from the internet at: http://www.cs.unc.edu/~lazebnik/research/spring08/lec17_bag_of_features.ppt#674,2,Overview: Bag-of-features models on Sep. 5, 2008, 29 pages.

Lazebnik, et al. "Beyond Bags of Features: Spatial Pyramid Matching for Recognizing Natural Scene Categories," 2006 IEEE Computer Society Conference on Computer Vision and Pattern Recognition, Oct. 2006, 8 pages.

Martin, et al. "Learning to Detect Natural Image Boundaries Using Local Brightness, Color, and Texture Cues," IEEE Transactions on Pattern Analysis and Machine Intelligence, vol. 26, No. 5, May 2004, 20 pages.

Masoud et al. "A Method For Human Action Recognition," Image and Vision Computing, vol. 21, No. 8, 2003, 31 pages.

Nowak, et al. "Sampling Strategies for Bag-of-Features Image Classification," Proceedings of the 9$^{th}$ European Conference on Computer Vision, Graz, Austria, May 2006 pp. 490-503.

Schechtman, Eli et al. "Space-Time Based Correlation," IEEE Computer Society Conference on Computer Vision and Pattern Recognition (CVPR '05), Jun. 2005, 8 pages.

* cited by examiner

HUMAN-ACTION RECOGNITION IN IMAGES AND VIDEOS

CROSS-REFERENCE TO RELATED APPLICATIONS

This application claims priority to pending U.S. Provisional Application Ser. No. 61/190,268, filed Aug. 26, 2008, the entire contents of which is hereby incorporated by reference.

BACKGROUND

Human-action detection and classification in images and video can be challenging because of camera motion, occlusions, and significant intra-class variations such as people posture, motion and illumination. Some action recognition approaches consider human actions as simple "moving objects" and are based on low-level image features (e.g., gray scale gradients, color and edges, foreground silhouettes and optical flow). These representations can work suitably well on capturing global motion of the full body and for relatively different and coarse actions such as walking, running, and jumping. But such representations may not be sufficient for detecting and recognizing more complex and subtle actions such as a person talking on the telephone, eating, working with a laptop computer, and other actions.

SUMMARY

In general, one aspect of the subject matter described in this specification can be embodied in a method that includes applying a plurality of low-level feature detectors to an image where each low-level feature detector produces a respective low-level feature vector that represents a detection result. The low-level feature vectors are provided to a plurality of higher-level feature detectors where each higher-level feature detector produces a respective higher-level feature vector that represents a detection result based on a distribution of features in one or more of the low-level feature vectors. The higher-level feature vectors are then provided to a classifier in order to classify a human-action in the image. Other embodiments of this aspect include corresponding systems, apparatus, and computer program products.

These and other embodiments can optionally include one or more of the following features. A low-level feature detector is one of a pixel color detector, a Haar-like filter or wavelet detector, an edge/histogram of gradients detector, an edge or boundary detector, a space-time optical flow detector, and a mel-frequency cepstral coefficients and wavelet detector. A higher-level feature detector is one of a face detector, a model-based skin detector, a phone detector, an pose estimation detector, and a motion estimation detector. Detecting by the face detector of a first region of the image corresponding to a human face. Refining a skin model used by the skin detector based on pixel information from the first region. The phone detector analyzes a second region of the image in proximity to the first region in order to detect a phone. The image is in a time-ordered sequence of images. The human-action is a person holding a phone or talking on a phone. Providing the higher-level feature detector vectors to the classifier comprises: 1) combining the higher-level feature vectors into a feature descriptor; and 2) providing the feature descriptor to the classifier, where the classifier has been trained on images represented as feature descriptors that embody or do not embody the human-action.

Particular embodiments of the subject matter described in this specification can be implemented to realize one or more of the following advantages. Human-actions are detected in images and video using a unified search engine capable of performing multiple classifications based on higher-level cues. Human-action detection can be used for searching images and video, and can be used for indexing video. Motion compensation can be used to avoid redundant analysis in video. A cue integration model allows integration of many types of higher-level cues including face, skin, object, pose, motion and audio cues. Human-action detection is optimized by searching for objects near skin and face regions.

In general, one aspect of the subject matter described in this specification can be embodied in a method that includes detecting in an image by a data processing apparatus a first region of the image where a human face is located. A second region of the image in proximity to the first region is analyzed by the data processing apparatus, where the analyzing includes: 1) applying a plurality of feature detectors to the second region where the plurality of feature detectors yield a plurality of feature vectors; and 2) providing the plurality of feature vectors to a classifier in order to classify an object in the second region. Other embodiments of this aspect include corresponding systems, apparatus, and computer program products.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

Figure 1:
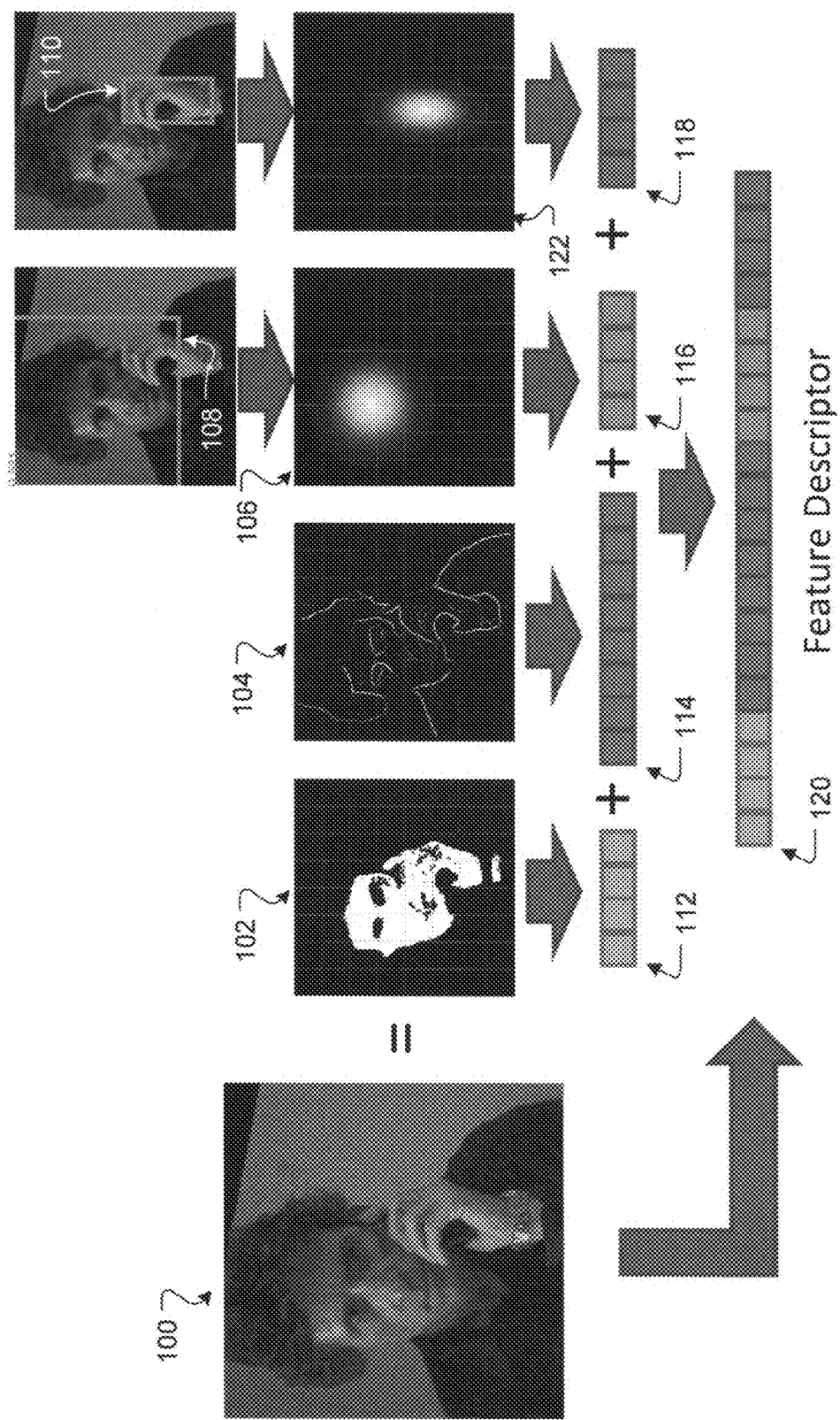
FIG. 1 is an illustration of example cue integration for human-action detection.

FIG. 1 is an illustration of example cue integration for human-action detection. In various implementations, an image 100 (e.g., from a sequence of images such as a video) is analyzed in a number of ways. By way of illustration, a skin map 102, an edge map 104, a face map 106 and an object map 122 are derived from the image 100.

In various implementations, the skin map 102 is a binary map that indicates whether each image pixel belongs to skin or not. Skin models will be discussed further below with reference to FIGS. 3A-D. The edge map 104 captures edge boundaries in the image 100. Edge detection will be discussed further below with reference to FIGS. 5A-C. In some implementations, the face map 106 is a 2-D Gaussian signal centered at the center of the rectangle 108 where a face is detected, with a peak strength proportional to the size of the rectangle 108. Likewise, the object map 122 is a 2-D Gaussian signal at the center of the rectangle 110 where an object (e.g., a cellular telephone) is detected, with a peak strength proportional to the size of the rectangle 110. Face and object detection will be discussed further below with reference to FIG. 4.

The skin map 102, edge map 104, face map 106 and object map 122 are converted to feature vector representations 112, 114, 116 and 118, respectively, using a spatial pyramid representation described by S. Lazabnik et al. in the article entitled "Beyond bag of features: spatial pyramid matching for recognizing natural scene categories", Computer Vision and Pattern Recognition, vol. 2, pp. 2169-2178 (2006), which is incorporated by reference herein in its entirety. However, other feature extraction techniques and feature vector representations are possible.

The Lazabnik et al. approach presents a method for partitioning an image into increasingly fine sub-regions and computing histograms of local features found inside each sub-region. The resulting "spatial pyramid" is an extension of an orderless bag-of-features image representation. In the spatial pyramid representation, there are several layers with different numberd of cells of different cell sized in each layer. For example. a pyramid representation for a region of size 80×60 pixels could have three layers as follows: the first layer consists of 4×4 cells of 20×15 pixels each, the second of 2×2 cells of size 40×30, and the last layer has one cell of the size of the entire region. Another approach for partitioning an image is described by Navneet Dalal and Bill Triggs in Histograms of Oriented Gradients for Human Detection, Proceedings of the 2005 IEEE Computer Society Conference on Computer Vision and Pattern Recognition, Vol. 1, which describes grids using Histograms of Oriented Gradient (HOG) descriptors to describe feature sets for human detection.

The feature vector is then a concatenation of the cell values each of which is the summed strength of the signal within the cell. If the original input signal has multiple channels (such as edge maps that contain responses from multiple orientations), the feature vector includes cell values of all channels. Therefore for a pyramid with N cells (N=16+4+1=21 in the above example), and C channels in each cell (e.g., C=4 edge orientations in the edge map 104) the feature vector size for the region is N times C. This histogram pyramid representation is applied for various types of signals that represent the various cues that are relevant for the complex action in hand.

Unlike other object recognition methods that utilize similar histogram-cell based representation to capture low-level cues (such as edge maps, gradients, pixels colors), we treat both low-level as well as high-level cues in a unified framework. In the example shown in FIG. 1 we see how a low-level cue (the edge map in 104) as well as higher-level cues—the skin mask 102, the face detection response signal 106 and the object detection response signal 122) are all represented using the same histogram-cell structures and then concatenated into a single vector. The high-level signals could be have a single channel (as an object detector continuous response signal) or a multi-channel vector signal (such as continuous responses with several classifiers). The signal could be the actual detector response or the response after a convolution with a blurring kernel. The signals 106 and 122 depict point-wise face and cell-phone detections (corresponding to the bounding boxes 108 and 110) convolved with a Gaussian kernel. The shape of the Gaussian kernel could be pre-determined or proportional to the detected object dimensions (the bounding box) and its height is a function of the detection score.

Generally speaking, the feature vectors 112, 114, 116 and 118 are combined or concatenated to form a feature descriptor 120. In various implementations, the feature descriptor 120 is provided to a number of classifiers which have been trained on images represented as feature descriptors 120 that embody or do not embody a particular human-action.

Figure 2:
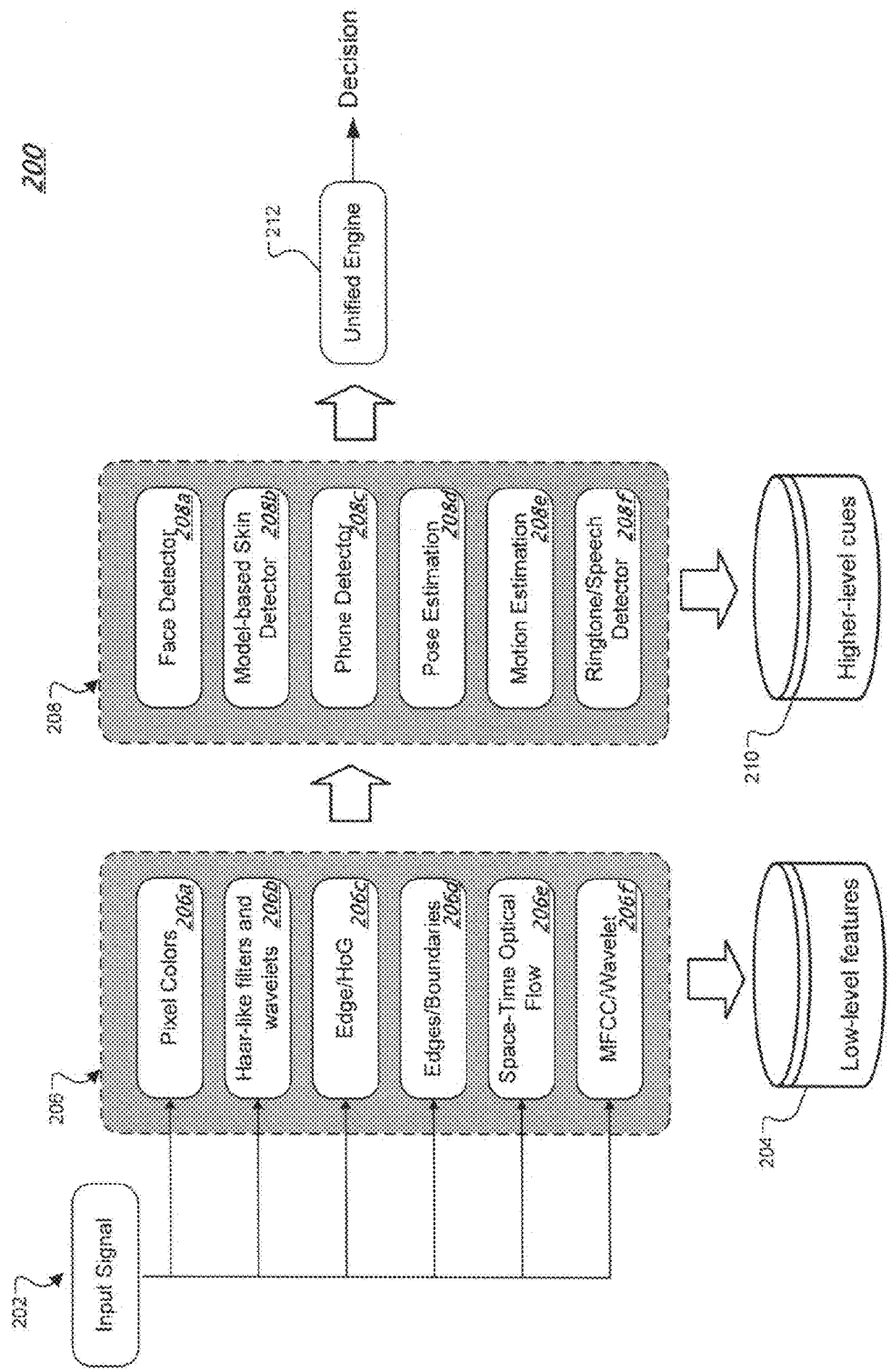
FIG. 2 is schematic diagram of an example system for human-action detection.

FIG. 2 is schematic diagram of an example system for human-action detection. An input signal 202 provides an image or a sequence of images (e.g., video) to the system 200. Both images and video can have metadata associated with them. For example, images can be encoded with the time and date the image was captured, the geographic location of image capture, camera parameters and other information. Video metadata can include closed captioning and subtitles, for example. Metadata can be used as a cue in detecting human-action. Video is typically encoded as streams of interleaved, time-stamped chunks of compressed image and audio segments. Video streams can be automatically segmented in the time domain based on shot detection, cross cut detection, keyframe detection, and closed-captioning analysis, for example. Other techniques for segmenting video are possible.

The input signal 202 is provided to an array of low-level feature detectors 206a-f which perform low-level feature extraction on the image data and store the results in persistent storage 204. By way of illustration, low-level feature detectors can include, but are not limited to, pixel color detectors 206a, Haar-like filters and wavelet detectors 206b, edge/HoG (Histogram of Gradient) detectors 206c, edge/boundary detectors 206d, space-time optical flow detectors 206e, mel-frequency cepstral coefficients (MFCC) and wavelet detectors 206f. Other low-level feature detectors are possible.

The output of the low-level feature extractors 206a-f is provided to a plurality of higher-level cue detectors 208. Generally speaking, higher-level cue detectors analyze the composition and distribution of low-level features. By way of illustration, higher-level cue detectors 208a-f can include, but are not limited to, face detectors 208a, model-based skin detectors 208b, phone detectors 208c, pose estimation detectors 208d, motion estimation detectors 208e, and ring tone/speech detectors 208f (e.g., based on speech recognition or closed captioning), spatial relationship detectors (e.g., phone close to face, hand close to phone), and action-specific detectors. Other higher-level cue detectors are possible. For example, a template correlation map where the correlation is based on the motion patterns (without appearance). See Space-Time Behavior Based Correlation by Eli Shechtman and Michal Irani, Proceedings of the 2005 IEEE Computer Society Conference on Computer Vision and Pattern Recognition, Vol. I. In some implementations, the correlation can be computed using space-time gradients (the low-level cues).

In some implementations, each cue detector 208a-f outputs higher-level features vectors describing corresponding detection results (usually by means of detection maps) that can be combined in the latter stage. For example, detector 206a could provided input to detectors 208a, 208b and 208c. Detector 206b could provide input to detector 208a. Detector 206c could provide input to detectors 208c, 208d and 208e. And detector 206d could provide input to detectors 208c and 208d. The output of the higher-level cue detectors is stored in persistent storage 210. In various implementations, the higher-level cues associated with an input image are stored in one or more vectors (e.g., face, skin and phone detection vectors that are described with reference to FIG. 1) and provided to unified engine 212 which performs a plurality of classifications on the input vectors. In some implementations, motion estimation vectors are spatial histograms of optical flows. In further implementations, speech detection vectors are probabilistic measures of being ringtone/speech signals in the temporal domain.

In some implementations, to avoid recalculating low-level features, higher-level cues, or both, the system 200 can take advantage of motion estimation information present in a video stream. Motion estimation is the process of determining motion vectors that describe the transformation from one 2D image to another; usually from adjacent frames in a video sequence. Motion vectors may relate to the whole image (global motion estimation) or specific regions, such as rectangular blocks, arbitrary shaped patches or even per pixel. The motion vectors may be represented by a translational model or many other models that can approximate the motion of a real video camera, such as rotation and translation in all three dimensions and zoom. By recognizing that a given image region has been seen before, in the same or a different location, low-level feature algorithms and higher-level cue algorithms can avoid reprocessing that image region.

Figure 3A:
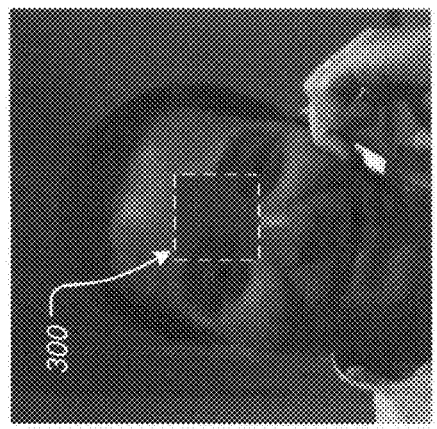
FIGS. 3A-D illustrate using face information to refine a skin model.
Figure 3B:
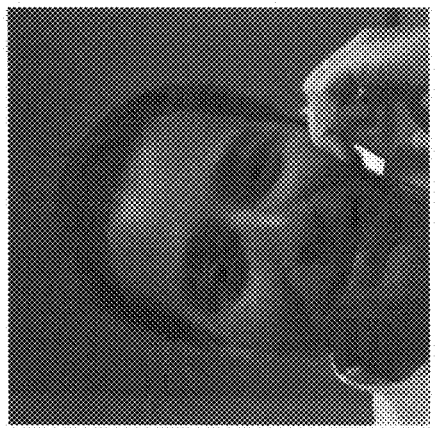
Figure 3C:
Figure 3D:
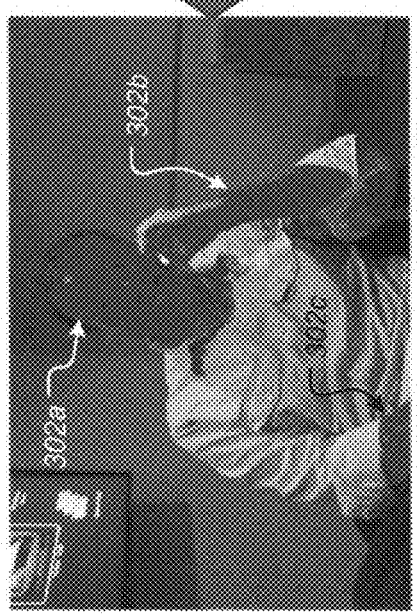

FIGS. 3A-D illustrate using face information to refine a skin model. When a face is detected in an image (e.g., FIG. 3A), pixel data from the face region can be used to refine the skin model, thus yielding a more accurate skin map for the image. In some implementations, a two-step progressive refinement on the skin model, starting with the one (as we called the universal skin model) described above. In the first step, the universal model is applied on the pixels near the center of the face region 300 as shown by the red area in FIG. 3B. In some implementations, a loose threshold on the model is used to pick as many skin-like pixels from the central regions as possible. If very few of such pixels are available, we declare the face detection to be a false positive. Otherwise, we continue to learn a new skin model which in some implementations is a Gaussian Mixture Model (described below) based on the selected pixel data. Other skin models are possible. In the second step, illustrated in FIG. 3C, we reapply the first step with the new skin model, and apply it to the entire face region instead of only the center. The areas detected as skin in FIG. 3C are colored red. The skin model is updated by re-learning a Gaussian Mixture on the newly picked pixels. The skin model can then be applied the entire image as shown in FIG. 3D, resulting in detected areas 302a, 302b and 302c.

In some implementations, the skin model is a pixel-wise skin detector based one described by M. J. Jones and J. M. Rehg in the article entitled "Statistical Color Models with Application to Skin Detection", International Journal of Computer Vision (1999), which is incorporated by reference herein in its entirety. The skin model is based on color distributions for skin and non-skin pixel classes learned from a large set of web page images. Skin and non-skin histogram models were constructed using a classifier training set of images from the web. The probability that a given image pixel color value belongs to the skin and non-skin classes is as follows:

$$P(rgb \mid skin) = \frac{s[rgb]}{T_s}, P(rgb \mid \neg skin) = \frac{n[rgb]}{T_n}$$

where s[rgb] is the pixel count contained in bin rgb of the skin histogram, n[rgb] is the equivalent count from the non-skin histogram, and $T_s$ and $T_n$ are the total counts contained in the skin and non-skin histograms, respectively.

Figure 4A:
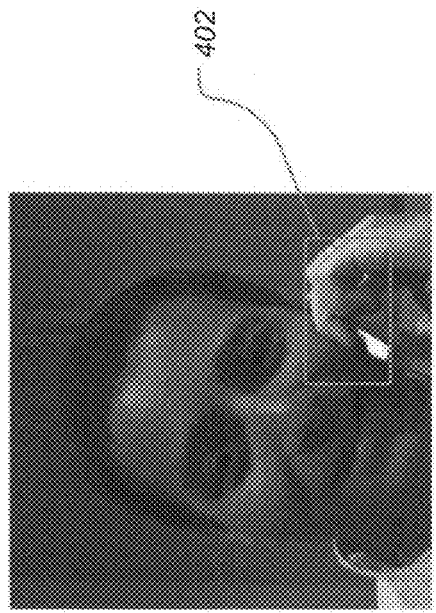
FIGS. 4A-C illustrate application of shape detection to a sample image.
Figure 4B:
Figure 4C:
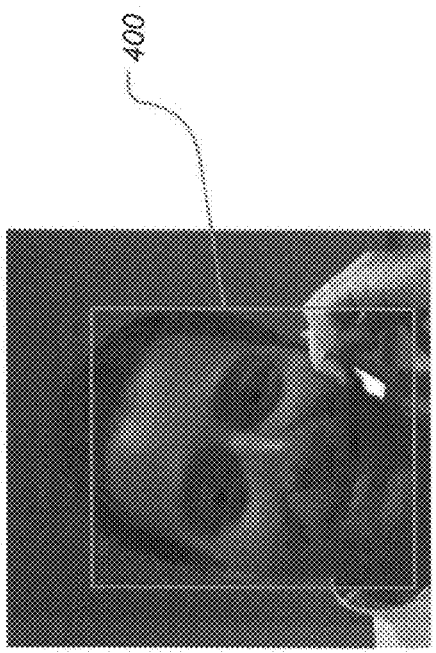

FIGS. 4A-C illustrate application of shape detection to a sample image. In some implementations, a telephone detector and a "speaking on a telephone" detector are then applied to areas of the image in proximity to identified skin and face regions, respectively, in order to detect telephones (e.g., 402 in FIG. 4B) and "speaking on a telephone" (e.g., 400 in FIG. 4C; steps 208, 210). This can save time by limiting the image search space since people tend to hold their phones in their hands or close to their faces. In further implementations, searching for objects can be performed around any identified skin regions; not merely faces or other specific regions. An object is in proximity to a region if the object is near the region, partially in the region, or entirely in the region. In various implementations, notion of nearness is defined as the maximum distance from a border of a skin or face region to the border of an object that is tolerated in order for the object to be considered near the skin or face region. The maximum distance can be user-specified or, for instance, can be automatically inferred based on observed distances in reference images used to train classifiers. Other ways of determining nearness are possible.

As described above, when a face is detected in an image pixel data from the face region can be used to refine the skin model, thus yielding a more accurate skin map for the image. In some implementations, the face detector is based one described by L. Bourdev and J. Brandt in the article entitled "Robust Object Detection Via Soft Cascade", Computer Vision and Pattern Recognition, vol. 2, pp. 236-243 (June 2005), which is incorporated by reference herein in its entirety. However, other face detectors are possible. The face detector described by Bourdev and Brandt uses a classifier that has been decomposed into a linear sequence, or cascade, of sub-classifiers. Each stage of the classifier is a scalar-valued decision function proportional to how well a given instance passes the stage and the relative importance of the stage. The decision functions are generalized to depend on values of prior stages instead of only depending on the current stage.

Figure 5C:
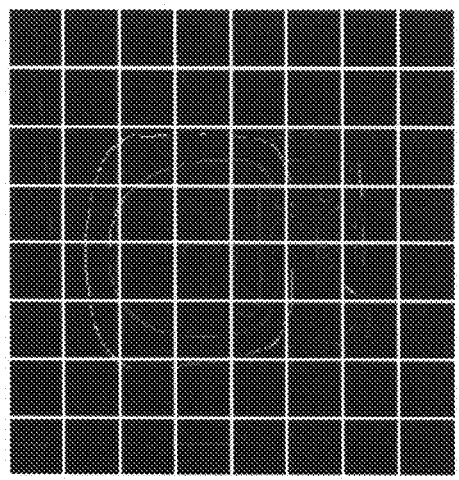
FIGS. 5A-C illustrate quantization of image features.
Figure 5B:
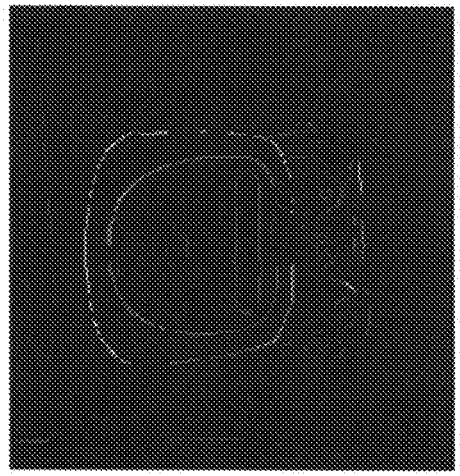
Figure 5A:
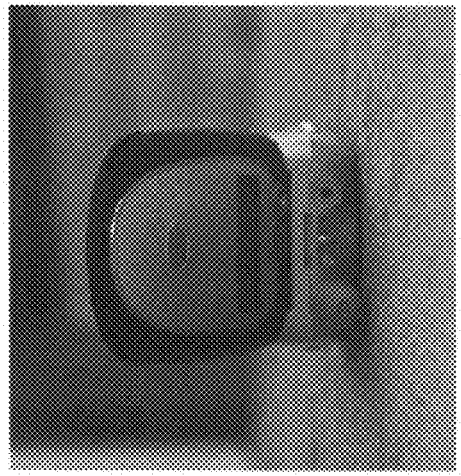

FIGS. 5A-C illustrate quantization of image features. In order to detect objects or shapes in images (e.g., a telephone or a "person speaking on a telephone"), a shape matching technique is employed. Reference images containing shapes (e.g., FIG. 5A) and not containing shapes are used to train a classifier (e.g., a SVM).

In various implementations, descriptors are determined using boundary signals of the reference images based on an approach described by Martin, D. R.; Fowlkes, C. C.; Malik, J. in the article entitled "Learning to detect natural image boundaries using local brightness, color, and texture cues", Pattern Analysis and Machine Intelligence, vol. 26, Issue 5, pp. 530-549 (May 2004), which is incorporated by reference herein in its entirety. The boundaries are measured by detecting statistical changes of local image cues such as brightness, color and texture. A classifier that learns a simple linear model of these multiple cues is trained using human labeled images as ground truth. The output of this classifier is the posterior probability of a boundary at each image location and orientation. This approach has shown significant improvement over previous approaches in image boundary detection. In alternative implementations, descriptors using other edge signals are possible. In the Martin et al. approach, oriented energy (OE) can be used to detect and localize brightness edges. OE is defined as:

$$OE_{\theta,\sigma} = (I * f_{\theta,\sigma}^e)^2 + (I * f_{\theta,\sigma}^o)^2$$

where $f_{\theta,\sigma}^e$ and $f_{\theta,\sigma}^o$ are a quadrature pair of even and odd symmetric filters at orientation θ and scale σ. The symmetric filter is a Gaussian second-derivative, and the corresponding odd-symmetric filter is its Hilbert transform. $OE_{\theta,\sigma}$ has maximum response for contours at orientation θ. FIG. 5B is an example of an edge map created using the above edge detection technique based on the reference image in FIG. 5A.

Next, features are extracted from the edge maps. In some implementations, feature extraction is based on the approach described by S. Lazabnik et al. in the article entitled "Beyond bag of features: spatial pyramid matching for recognizing natural scene categories", Computer Vision and Pattern Recognition, vol. 2, pp. 2169-2178 (2006), which is incorporated by reference herein in its entirety. However, other feature extraction techniques are possible.

The Lazabnik et al. approach presents a method for partitioning an image into increasingly fine sub-regions and computing histograms of local features found inside each sub-region. The resulting "spatial pyramid" is an extension of an orderless bag-of-features image representation. For example, the edge map in FIG. 5B is quantized into subregions as shown in FIG. 5C. In each grid cell (e.g., 500), the edge strength of each descriptor (e.g., edge gradient or edge orientation) is summed. Given two images represented as such, visual similarities between the two can, in some implementations, be measured using a distance function between the summed descriptors.

The approach described above can be generalized to other human-actions that comprise different representation of higher-level cues. For instance, in "a person using a laptop computer" action, the laptop as an object is a semantic cue besides the person's face and skin. In "a person eating" action, cutlery detection is a useful cue.

Figure 6:
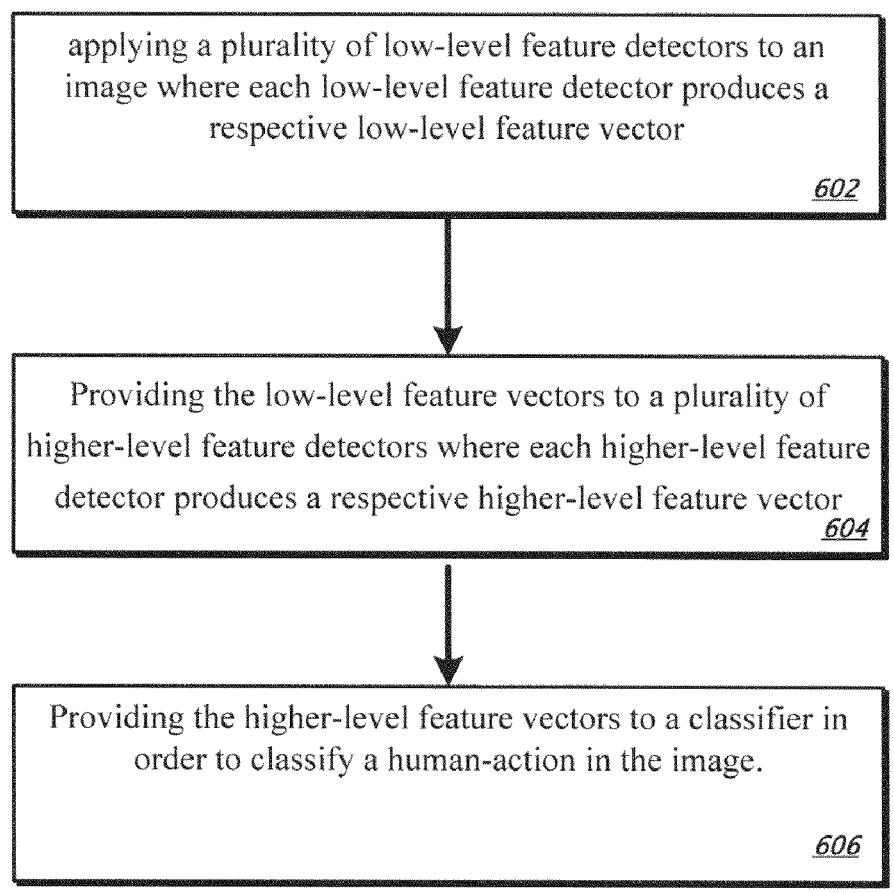
FIG. 6 is a flow diagram of an example technique for human-action detection.

FIG. 6 is a flow diagram of an example technique for human-action detection. A plurality of low-level feature detectors are applied to an image where each low-level feature detector produces a respective low-level feature vector that represents a detection result (step 602). The low-level feature vectors are then provided to a plurality of higher-level feature detectors where each higher-level feature detector produces a respective higher-level feature vector that represents a detection result based on a distribution of features in one or more of the low-level feature vectors (step 604). The higher-level feature vectors are then provided to a classifier in order to classify a human-action in the image (step 606).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed; to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method for detecting human action in images, the method comprising:
    applying a plurality of low-level feature detectors to an image where each low-level feature detector produces a respective low-level feature vector that represents a detection result;
    providing the low-level feature vectors to a plurality of higher-level feature detectors where each higher-level feature detector produces a respective higher-level feature vector that represents a detection result based on a distribution of features in one or more of the low-level feature vectors; and
    providing the higher-level feature vectors to a classifier in order to classify a human-action in the image.

2. The method of claim 1 where a low-level feature detector is one of a pixel color detector, a Haar-like filter or wavelet detector, an edge/histogram of gradients detector, an edge or boundary detector, a space-time optical flow detector, and a mel-frequency cepstral coefficients and wavelet detector.

3. The method of claim 1 where a higher-level feature detector is one of a face detector, a model-based skin detector, a phone detector, an pose estimation detector, and a motion estimation detector.

4. The method of claim 3, further comprising detecting by the face detector of a first region of the image corresponding to a human face.

5. The method of claim 4, further comprising refining a skin model used by the skin detector based on pixel information from the first region.

6. The method of claim 4 where the phone detector analyzes a second region of the image in proximity to the first region in order to detect a phone.

7. The method of claim 1 where the image is in a time-ordered sequence of images.

8. The method of claim 1 where the human-action is a person holding a phone or talking on a phone.

9. The method of claim 1 where providing the higher-level feature detector vectors to the classifier comprises:
    combining the higher-level feature vectors into a feature descriptor; and
    providing the feature descriptor to the classifier, where the classifier has been trained on images represented as feature descriptors that embody or do not embody the human-action.

10. A system comprising:
    a computer readable medium including a program product;
    a display device; and
    one or more processors configured to interact with the display device and to execute the program product and perform operations comprising:
        applying a plurality of low-level feature detectors to an image where each low-level feature detector produces a respective low-level feature vector that represents a detection result;
        providing the low-level feature vectors to a plurality of higher-level feature detectors where each higher-level feature detector produces a respective higher-level feature vector that represents a detection result based on a distribution of features in one or more of the low-level feature vectors; and
        providing the higher-level feature vectors to a classifier in order to classify a human-action in the image.

11. The system of claim 10 where a low-level feature detector is one of a pixel color detector, a Haar-like filter or wavelet detector, an edge/histogram of gradients detector, an edge or boundary detector, a space-time optical flow detector, and a mel-frequency cepstral coefficients and wavelet detector.

12. The system of claim 10 where a higher-level feature detector is one of a face detector, a model-based skin detector, a phone detector, an pose estimation detector, and a motion estimation detector.

13. The system of claim 12 where the operations further comprise detecting by the face detector of a first region of the image corresponding to a human face.

14. The system of claim 13 where the operations further comprise refining a skin model used by the skin detector based on pixel information from the first region.

15. The system of claim 13 where the phone detector analyzes a second region of the image in proximity to the first region in order to detect a phone.

16. The system of claim 10 where the image is in a time-ordered sequence of images.

17. The system of claim 10 where the human-action is a person holding a phone or talking on a phone.

18. The system of claim 10 where providing the higher-level feature detector vectors to the classifier comprises:
combining the higher-level feature vectors into a feature descriptor; and
providing the feature descriptor to the classifier, where the classifier has been trained on images represented as feature descriptors that embody or do not embody the human-action.

19. A computer program product, encoded on a computer-readable medium, operable to cause data processing apparatus to perform operations comprising:
applying a plurality of low-level feature detectors to an image where each low-level feature detector produces a respective low-level feature vector that represents a detection result;
providing the low-level feature vectors to a plurality of higher-level feature detectors where each higher-level feature detector produces a respective higher-level feature vector that represents a detection result based on a distribution of features in one or more of the low-level feature vectors; and
providing the higher-level feature vectors to a classifier in order to classify a human-action in the image.

20. The program product of claim 19 where a low-level feature detector is one of a pixel color detector, a Haar-like filter or wavelet detector, an edge/histogram of gradients detector, an edge or boundary detector, a space-time optical flow detector, and a mel-frequency cepstral coefficients and wavelet detector.

21. The program product of claim 19 where a higher-level feature detector is one of a face detector, a model-based skin detector, a phone detector, an pose estimation detector, and a motion estimation detector.

22. The program product of claim 21 where the operations further comprise detecting by the face detector of a first region of the image corresponding to a human face.

23. The program product of claim 22 where the operations further comprise refining a skin model used by the skin detector based on pixel information from the first region.

24. The program product of claim 22 where the phone detector analyzes a second region of the image in proximity to the first region in order to detect a phone.

25. The program product of claim 19 where the image is in a time-ordered sequence of images.

26. The program product of claim 19 where the human-action is a person holding a phone or talking on a phone.

27. The program product of claim 19 where providing the higher-level feature detector vectors to the classifier comprises:
combining the higher-level feature vectors into a feature descriptor; and
providing the feature descriptor to the classifier, where the classifier has been trained on images represented as feature descriptors that embody or do not embody the human-action.

28. A computer-implemented method comprising:
detecting in an image by a data processing apparatus a first region of the image where a human face is located;
analyzing a second region of the image in proximity to the first region by the data processing apparatus, where the analyzing includes:
applying a plurality of feature detectors to the second region where the plurality of feature detectors yield a plurality of feature vectors; and
providing the plurality of feature vectors to a classifier in order to classify an object in the second region.

\* \* \* \* \*